United States Patent [19]
Weiss et al.

[11] Patent Number: 5,956,621
[45] Date of Patent: Sep. 21, 1999

[54] METHOD AND APPARATUS FOR ADAPTING OMNIDIRECTIONAL SYNCHRONOUS WIRELESS COMMUNICATIONS PROTOCOL TO SECTORIAL ENVIRONMENTS

[75] Inventors: Anthony J. Weiss, Tel Aviv; Yair Karmi, Rishon Lezion, both of Israel; Ilan Zorman; Haim Harel, both of Palo Alto, Calif.

[73] Assignee: Wireless Online, Inc., Los Altos, Calif.

[21] Appl. No.: 08/861,458

[22] Filed: May 22, 1997

[51] Int. Cl.[6] ........................................ H04G 7/20
[52] U.S. Cl. .................. 455/38.1; 455/31.2; 455/63; 455/343; 455/503; 455/38.3; 340/825.44; 370/311; 370/312
[58] Field of Search ............................. 455/31.1, 31.2, 455/31.3, 38.3, 343, 503, 62, 63, 502; 340/825.44; 370/311, 312, 324

[56] References Cited

U.S. PATENT DOCUMENTS

| | | | |
|---|---|---|---|
| 4,449,248 | 5/1984 | Leslie et al. ............................. | 455/38.3 |
| 4,882,588 | 11/1989 | Ruiz et al. . | |
| 5,230,084 | 7/1993 | Nguyen .................................... | 455/38.3 |
| 5,448,751 | 9/1995 | Takenaka et al. . | |
| 5,485,633 | 1/1996 | Burke et al. ..................... | 340/825.44 X |
| 5,530,918 | 6/1996 | Jasinski .......................... | 340/825.44 X |
| 5,648,784 | 7/1997 | Shaw et al. . | |
| 5,726,640 | 3/1998 | Jone et al. ....................... | 340/825.44 X |

OTHER PUBLICATIONS

Motorola, Inc. FLEXstack One Way Software Development Kit, Version 2.0, 66 pages (Dec. 13, 1996).
Motorola, Inc., Flexible High Speed Paging Protocol Benchmarking, 16 pages (Apr. 26, 1994).
Motorola, Inc., FLEX Protocol's Operational Capabilities for Local, Regional, Nationwide and Global Roaming—Preliminary, 32 pages (Jul. 18, 1995).
Motorola, Inc., Typical FLEX Pager Block Diagram with FLEXstack, 1 page (Mar. 27, 1997) www.mot.com/SPS/DSP/flexchip/.
Texas Instruments TMS320FLEX1 Chipset Product Brief, 3 pages (Mar. 27, 1997) www.ti.com/sc/docs/wireless/page-.htm.
Texas Instruments Press Release, "TI Chip Set Supporting FLEX Messaging Protocol Now Available" 2 pages (Nov. 11, 1996) www.ti.com/sc/docs/news/1996/96070.htm.
Texas Instruments, TLV5591 Data Manual for FLEX Decoder, Appendix A and B, 22 pages (Apr. 17, 1996).
Balanis, C.A., in: Antenna Theory, Analysis and Design, Harper and Row, Inc., pp. 679–685 and 698–699 (1982).
Mailloux, R.J., in: Phase Array Antenna Handbook, Artech House, Inc., pp. 13–20, 438–445, and 521–524 (1994).
Motorola, Inc. Semiconductor Technical Data, FLEXchip Signal Processor, Publication No. MC68175/D 109 pages (1996).

*Primary Examiner*—Dwayne D. Bost
*Assistant Examiner*—Nay A. Maung
*Attorney, Agent, or Firm*—Townsend and Townsend and Crew; Kenneth R. Allen

[57] ABSTRACT

A pager protocol that permits individual pagers to operate in an inactive mode when not being addressed to save power but nonetheless also accommodates high capacity transmission schemes that require non-continuous illumination of sectors occupied by individual pagers. Capabilities of a conventional omnidirectional paging protocol such as one of the FLEX™ family may be exploited to facilitate operation in the context of non-continous illumination. A pager transmitter transmits a simulcast transmission where all pagers in all sectors receive the same message. This message includes schedule information about future transmissions to individual pagers. Pagers then plan their switching between the active and inactive states in accordance with the schedule which takes into account a timetable for illuminating sectors.

20 Claims, 8 Drawing Sheets

METHOD AND APPARATUS FOR ADAPTING OMNIDIRECTIONAL SYNCHRONOUS WIRELESS COMMUNICATIONS PROTOCOL TO SECTORIAL ENVIRONMENTS

STATEMENT OF RELATED APPLICATIONS

The present application is related to the subject matter of a co-assigned application, U.S. patent application Ser. No. 08/808,347 entitled VERSATILE ANTENNA ARRAY FOR MULTIPLE PENCIL BEAMS AND EFFICIENT BEAM COMBINATIONS, and filed on Feb. 28, 1997, the contents of which are herein incorporated by reference. The present application is also related to the subject matter of a co-assigned application entitled MULTI-CHANNEL/ MULTI-BEAM ENCODING SYSTEM filed on the same day as the present application. The contents of this co-filed application are also incorporated herein by reference.

BACKGROUND OF THE INVENTION

The present invention relates to paging protocols and more particularly to paging protocols for use in multi-sectorial paging systems wherein not all sectors are illuminated simultaneously.

FLEX™ is a well-known paging protocol developed by Motorola, Inc. of Schaumburg, Ill. intended for use with omnidirectional antennas at a plurality of pager transmitter sites. Previous implementations of the FLEX protocol assume that all of the pager transmitter sites broadcast the same signal simultaneously at the same frequency. This style of simultaneous broadcasting is known as simulcast.

In accordance with the FLEX protocol, most of the pagers are in an inactive or sleep mode to conserve energy and increase battery life while the single pager or pagers that are being addressed actively receive and decode messages. The pagers are programmed to wake up periodically in order to check if they have messages, to receive messages, and to maintain their synchronization with the system.

In FLEX, broadcasting time is divided into four minute cycles and each four minute cycle is divided into 128 1.875 second frames. There is a programmable interval between frames for which a pager awakens. There are trade-offs in determining this programmable interval. When the interval is long, energy conservation and thus battery life are improved. However, long intervals are associated with increased latency in receiving messages. In conventional FLEX practice, the interval between frames is $N=2^n$ where n is an integer referred to the collapse value and ranges between 0 and 7. Each pager has its own collapse value which may be user selected to optimize battery life and message latency. However, there is also a "system maximum collapse value," m, determined for the pager network as a whole. If m is less than n for a particular pager, the pager will wake up every $N=2^m$ frames. If n is less than m, the pager will wake up every $N=2^n$ frames.

To distribute pager wake up frames in time and thereby optimize system throughput, each pager is assigned a base frame in the set of 128 frames. The pager wakes up for its base frames and for subsequent frames as determined by the current collapse value. For example, a pager with collapse value of 4 and frame 1 as its base frame will wake up at frames 1, 17, 33, 49, 65, 81, 97, 113, 1, 17, etc. A pager with collapse value of 5 and frame 6 as its base frame will wake up at frames 6, 38, 70, 102, etc.

In the prior art paging system described here, all pagers are accessible during every frame. The assignee of the present application has developed a multi-beam transmission system wherein different beams radiated from a common transmission site carry disparate signals on the same frequency, greatly enhancing system capacity. The system is described in U.S. patent application Ser. No. 08/808,347. One limitation is that adjacent beams generally cannot carry disparate signals simultaneously on the same frequency without causing destructive interference. Therefore, in a pager application, the transmission site will not illuminate all beams simultaneously. It can be appreciated then that the wake-up frame of a pager may not necessarily coincide with the illumination period of the beam servicing the pager.

A similar problem arises in a cellular paging system where there are restrictions on simultaneous transmissions of disparate signals on the same frequency by transmission sites servicing adjacent cells. Again, there is no guarantee that the transmission site servicing a particular pager will be active during the pager's wake-up frame. There is thus a basic incompatibility between the conventional application of an omnidirectional pager protocol that keeps pagers off during certain time periods to save power and a transmission system that increases capacity by spatial multiplexing but places restrictions on the time periods when any particular pager may be addressed. What is needed is a pager protocol that provides the power consumption advantages gained by keeping pagers off except when they need to be addressed but can nonetheless function in an environment where particular geographic sectors are not continuously illuminated.

SUMMARY OF THE INVENTION

The present invention provides a pager protocol that permits individual pagers to operate in an inactive mode when not being addressed to save power but nonetheless also accommodates high capacity transmission schemes that require non-continuous illumination of sectors occupied by individual pagers. In one embodiment, features of a conventional omnidirectional paging protocol such as one of the FLEX™ family are exploited to operate in the context of non-continuous illumination. In one embodiment, a pager transmitter site transmits a simulcast transmission where all sectors receive the same message. This message includes schedule information about future transmissions to individual pagers. Pagers then plan their switching between the active and inactive states in accordance with the schedule which takes into account a timetable for illuminating sectors.

In accordance with a first aspect of the present invention, a method is provided for operating a pager network that transmits to a plurality of pager receivers. Each pager receiver is accessible by a selected one of a plurality of channels. Furthermore, each pager receiver is switchable between an active state and an inactive state. The method includes steps of developing a schedule of transmissions addressed to various pager receivers of the plurality of pager receivers, and transmitting a simulcast message via all of the plurality of channels during a time interval. The simulcast message commands each of the various pager receivers to switch to the active state in accordance with the schedule so that each of the various pager receivers is in the active state to receive its transmission and in the inactive state when there is nothing to receive.

In accordance with a second aspect of the present invention, a method is provided for operating a pager network that transmits to a plurality of pager receivers. Each pager receiver is accessible by a selected one of a plurality of channels. Each pager receiver is switchable between an active state and an inactive state. The method includes steps of developing a list of pager receivers to be addressed with individually targeted messages during a predetermined time interval, and transmitting a simulcast message via all of the plurality of channels at the beginning of the predetermined time interval. The simulcast message commands each pager receiver on the list to be in an active state for all of the predetermined time interval.

A further understanding of the nature and advantages of the inventions herein may be realized by reference to the remaining portions of the specification and the attached drawings.

DESCRIPTION OF SPECIFIC EMBODIMENTS

Paging Transmission Environments Suitable for Implementing a Protocol of the Present Invention A protocol according to the present invention finds application in, e.g., wireless communication networks where one or more stationary nodes are used to transmit information to a geographic region divided into sectors but individual sectors are continuously illuminated by the stationary node. One example is a pager network including a pager transmitter site that uses multiple beams to carry disparate signals on the same frequency where each beam is not continuously illuminated. Another example is a cellular paging system where all cells use the same frequency to transmit disparate signals but geographically proximate cells cannot transmit simultaneously and thus cells are not always illuminated.

Figure 1:
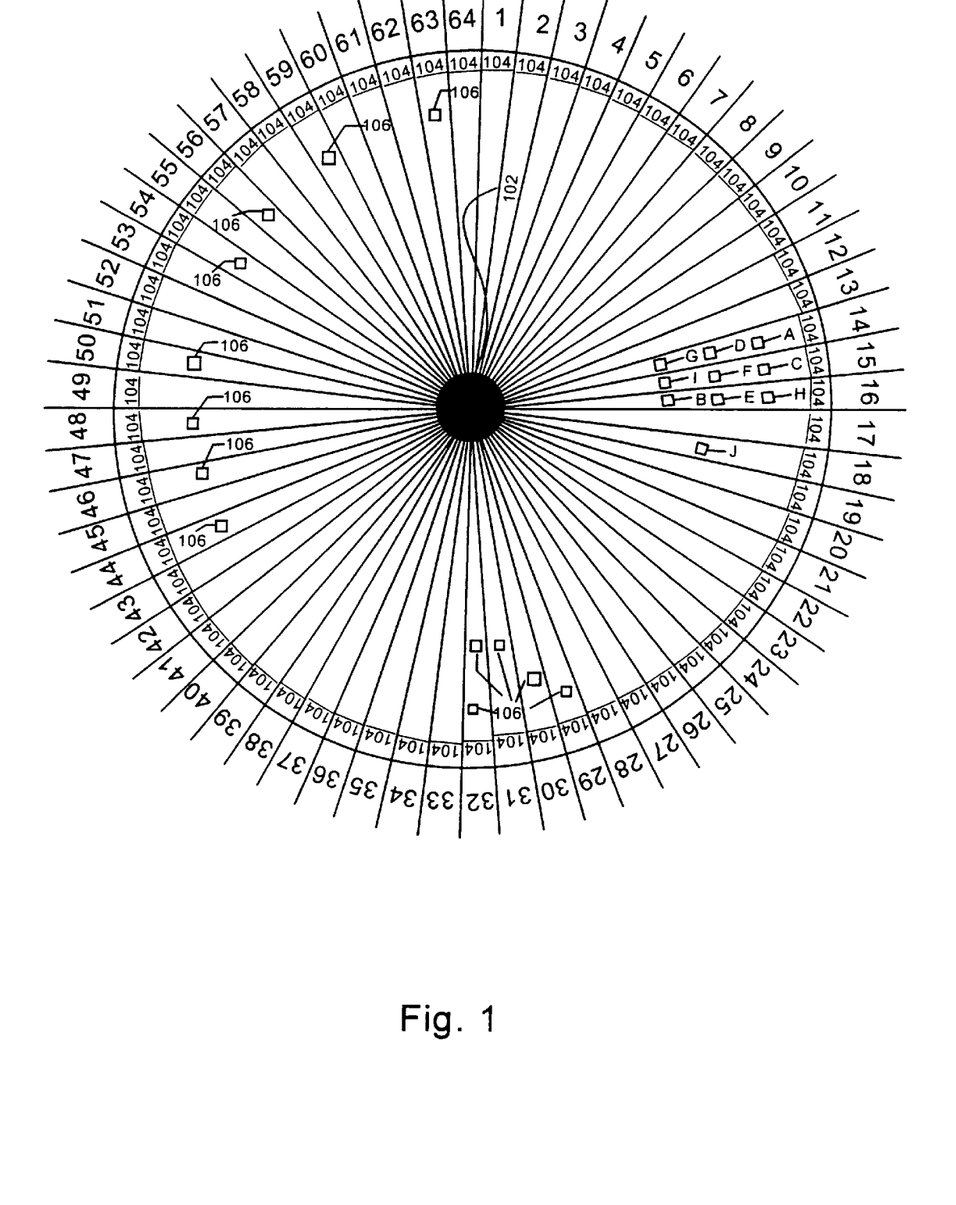
FIG. 1 depicts a multi-beam transmission environment suitable for implementing a protocol according to the present invention.

FIG. 1 depicts a multi-beam pager network 100 using a multi-beam transmission scheme described in U.S. patent application Ser. No. 08/808,347. A pager transmitter site 102 is equipped with an antenna system that outputs 64 different beams, approximately evenly spaced from each other around transmitter site 102. Each beam defines a different sector 104 of the region surrounding site 102. A plurality of pager receivers 106 are distributed throughout the various sectors. Certain ones of the plurality of pager receivers are labeled with letters A through—to aid in illustrating the example.

Beams that are not adjacent to one another may carry disparate signals on the same frequency at the same time without interfering. However, when adjacent beams operate simultaneously on the same frequency, they should carry identical signals to avoid destructive interference. Although FIG. 1 depicts 64 beams, the present invention does not require any particular number of beams. In a preferred family of embodiments, the number of beams is between 8 and 128.

Also, FIG. 1 depicts the beams transmitted for a particular frequency. The present invention encompasses both single and multiple frequency embodiments. Using more than one frequency increases system capacity at the expense of greater spectrum usage and subscriber unit complexity.

When individually addressed messages are to be sent to pager receivers 106, pager transmitter site illuminates the various sectors over time in such a way that adjacent beams operating on the same frequency do not carry disparate signals. However, when messages are to be sent to all pager receivers ("simulcast" messages), all sectors may be illuminated simultaneously with the same signal.

Figure 2:
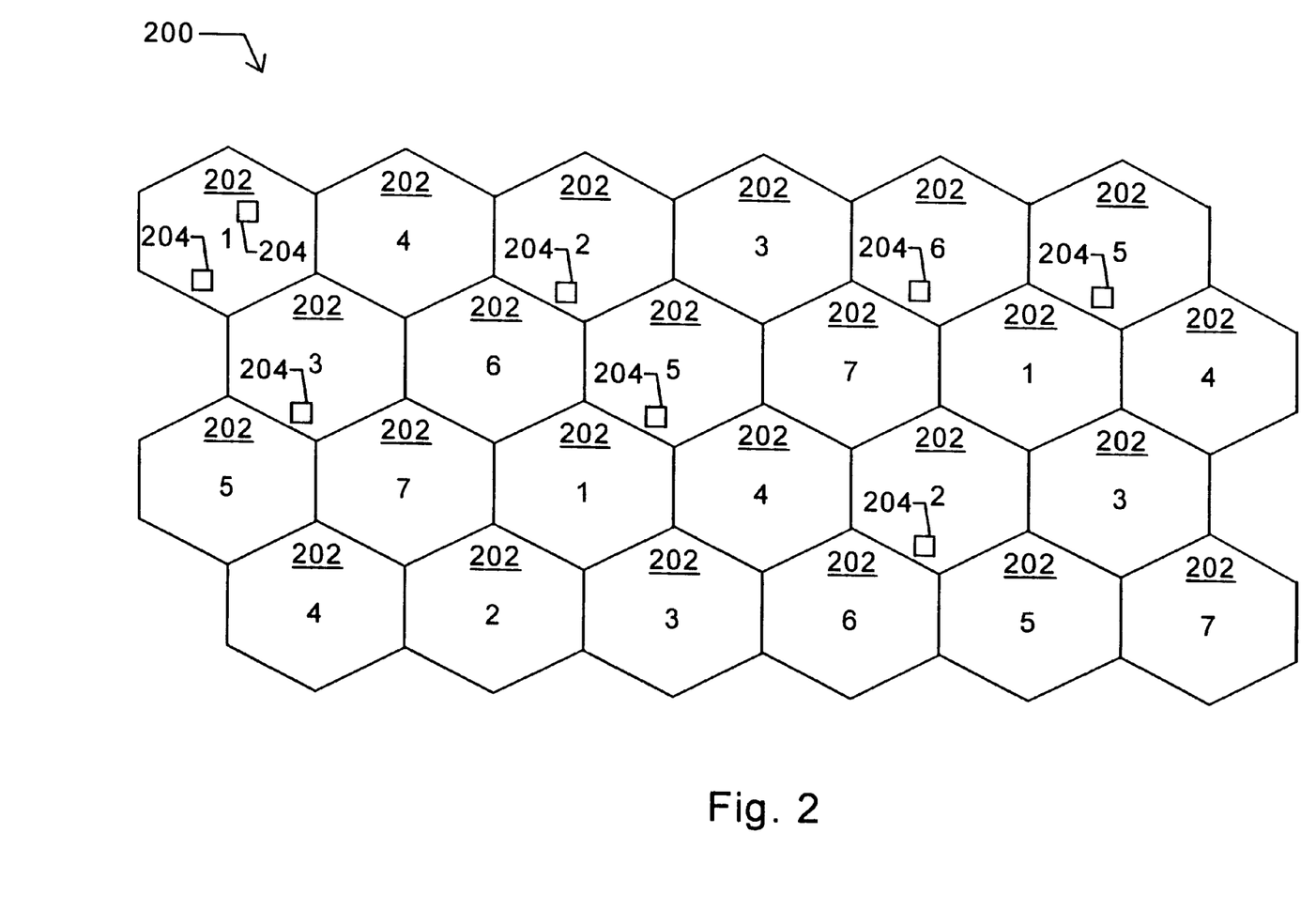
FIG. 2 depicts a cellular transmission environment suitable for implementing a protocol according to the present invention.

FIG. 2 depicts a cellular transmission environment suitable for implementing a protocol according to the present invention. A geographical region 200 is divided into a plurality of sectors 202 referred to as "cells." Each cell 202 is serviced by an individual pager transmitter site (not shown). Pager receivers 204 are found in the individual cells 202. Each cell uses the same frequency. In a simulcast mode, each of the cells carries the same signal. In a non-simulcast mode, the cells carry disparate signals on the same frequency. However, to avoid destructive interference, geographically proximate cells cannot transmit simultaneously.

In one exemplary scheme, the cells are divided into seven groups for non-simulcast transmissions. In FIG. 2, each cell is labeled with a number 1 through 7 to indicate the group it belongs to. Cells in the same group may transmit disparate signals on the same frequency simultaneously without interfering with each other but cells of different groups will potentially interfere with each other while transmitting simultaneously.

In either of FIGS. 1–2, the sectors correspond to channels that can either carry the same signals or disparate signals.

Protocol Operation According to Embodiments of the Present Invention

The present invention contemplates operating a pager network in two modes, simulcast and non-simulcast. In a simulcast mode, all sectors receive the same signal on the same frequency. In the non-simulcast mode, sectors receive disparate signals on the same frequency but not all sectors receive signals simultaneously. The simulcast mode is used for transmitting messages addressed to all pagers. All pagers know when to turn on for the simulcast messages. These simulcast messages include information instructing individual pagers when they can expect to receive individually addressed messages. In one embodiment, these simulcast messages include a schedule of which pagers are to be individually addressed and when. In an alternative embodiment, the schedule is a list of pagers to be individually addressed prior to a next simulcast message.

Figure 3:
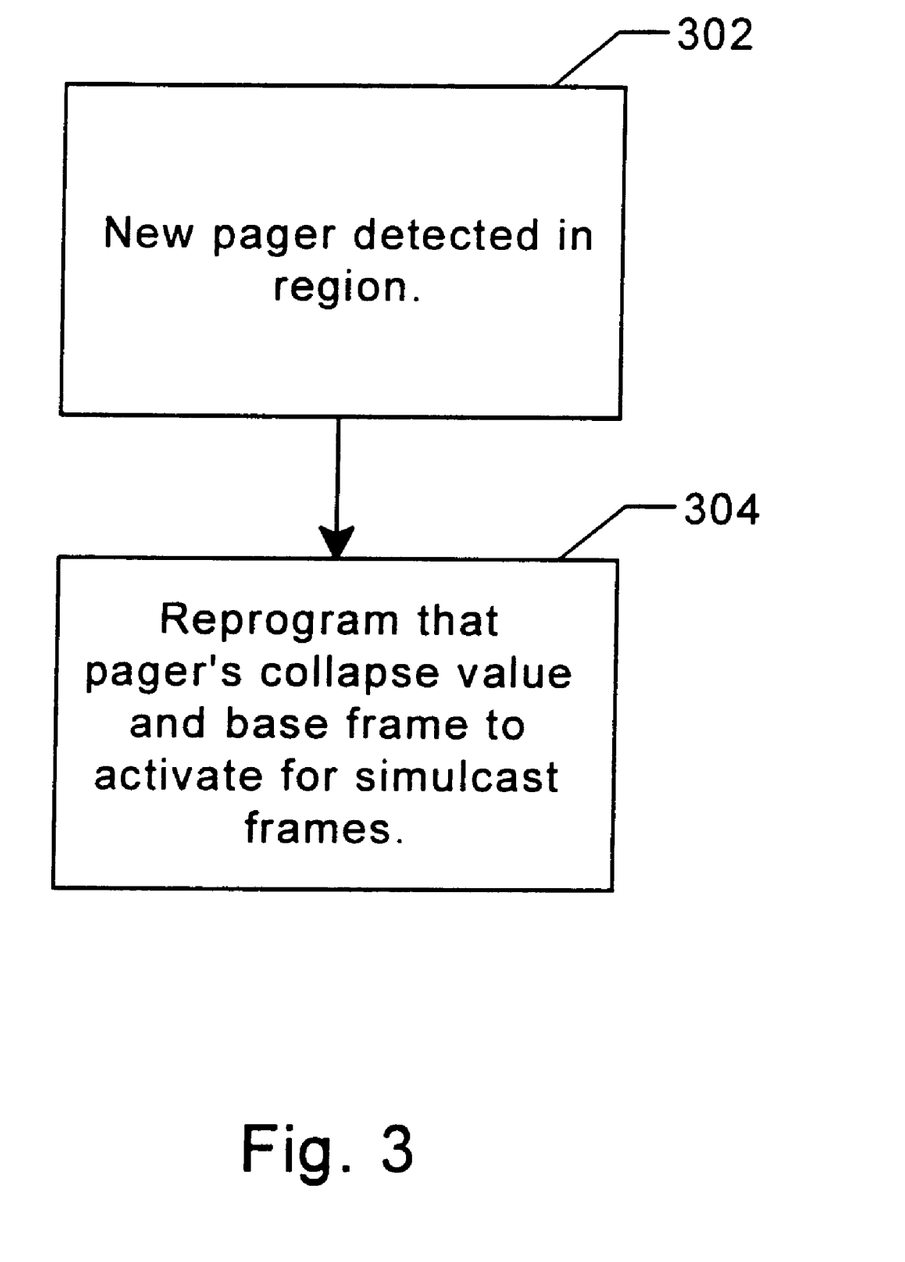
FIG. 3 depicts step of integrating a newly arrived pager into the pager network of one embodiment of the present invention.

A preferred embodiment takes advantage of capabilities of the FLEX protocol to program pagers to switch into an active mode to receive simulcast messages simultaneously rather than at disparate times as in previous systems implementing the FLEX protocol. FIG. 3 depicts steps of integrating a newly arrived pager into the pager network of one embodiment of the present invention. At step 302, pager transmitter site 102 detects the presence of a new pager receiver within in its range. In a preferred embodiment, subscriber pagers include both a pager receiver and a transmitter to facilitate two-way communication. The incorporated transmitter is used to register to pager transmitter site 102. In the cellular embodiment of FIG. 2, the registration is to one of the sites corresponding to a particular cell.

At step 304, pager transmitter site 102 responds to the detected new pager by sending a message to the new pager to wake up for periodic simulcast messages. In the FLEX context, the simulcast message is incorporated into a FLEX frame that includes a command to change the collapse value and base frame of the pager so that the pager receiver switches into an active state for each simulcast message. The collapse value programmed may be either the pager's own collapse value or the system collapse value maintained by the pager.

Figure 4:
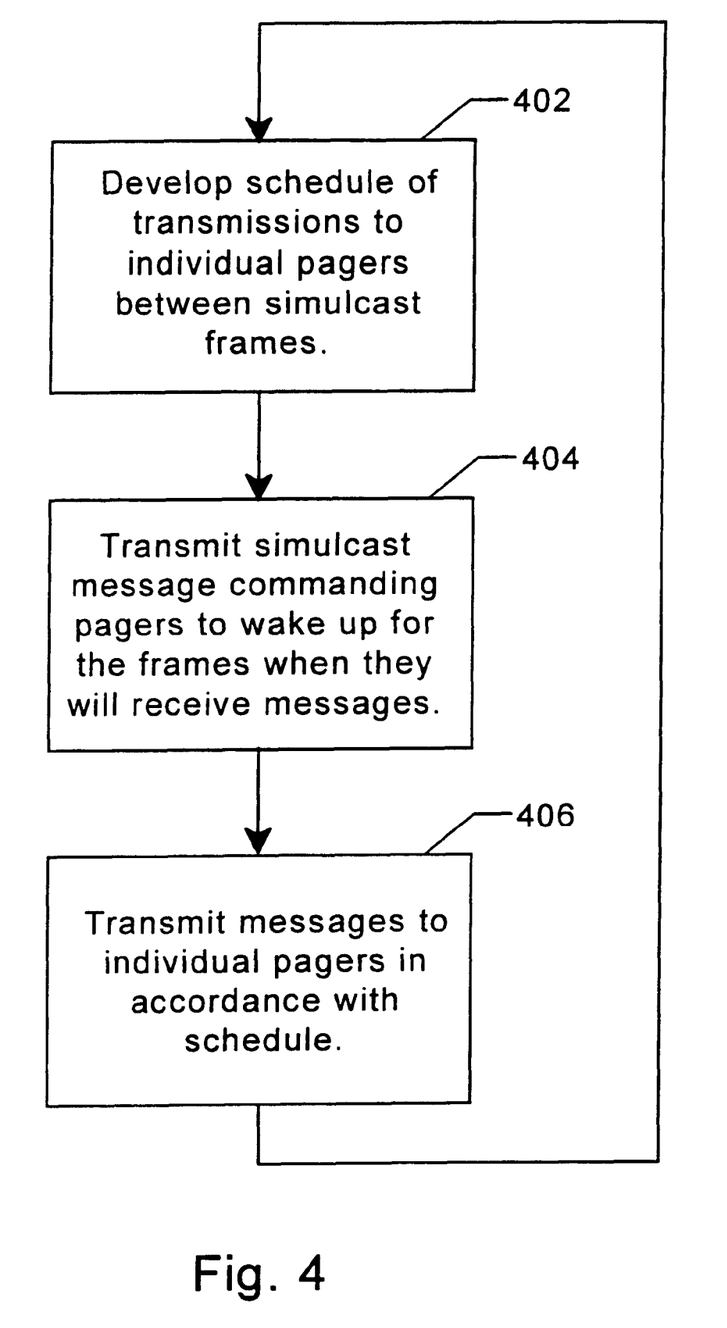
FIG. 4 depicts a flowchart describing steps of operating a pager network in accordance with one embodiment of the present invention.

FIG. 4 depicts a flowchart describing further steps of operating a pager network in accordance with one embodiment of the present invention. In operation, pager transmitter site 102 will have various individual messages for transmission to pager receivers 106. At step 402, pager transmitter site 102 develops a transmission schedule including, for each sector, which pager receivers are to be addressed and at what time. The transmission schedule takes into account which sectors can be accessed simultaneously and which cannot due to interference characteristics. The schedule preferably covers the time between two successive simulcast messages.

At step 404, pager transmitter site 102 transmits the schedule information within a simulcast message to all the pager receivers 106. In the FLEX context, the simulcast message is included within a frame. The schedule as transmitted within this simulcast frame includes the address or CAP code of each pager to be addressed and the frame number for which the individual pager is to switch to an active state to decode its own message. Each pager receiver receives and interprets the schedule information. If a particular pager receiver has been designated to receive a message at a particular time, it switches into an active state at that time to receive its message. Following the simulcast message and prior to a next simulcast message, at step 406, pager transmitter site 102 follows the schedule, transmitting individually addressed messages to pagers at the times designated by the schedule. When it is time for the next simulcast message, processing returns to step 402.

Figure 5:
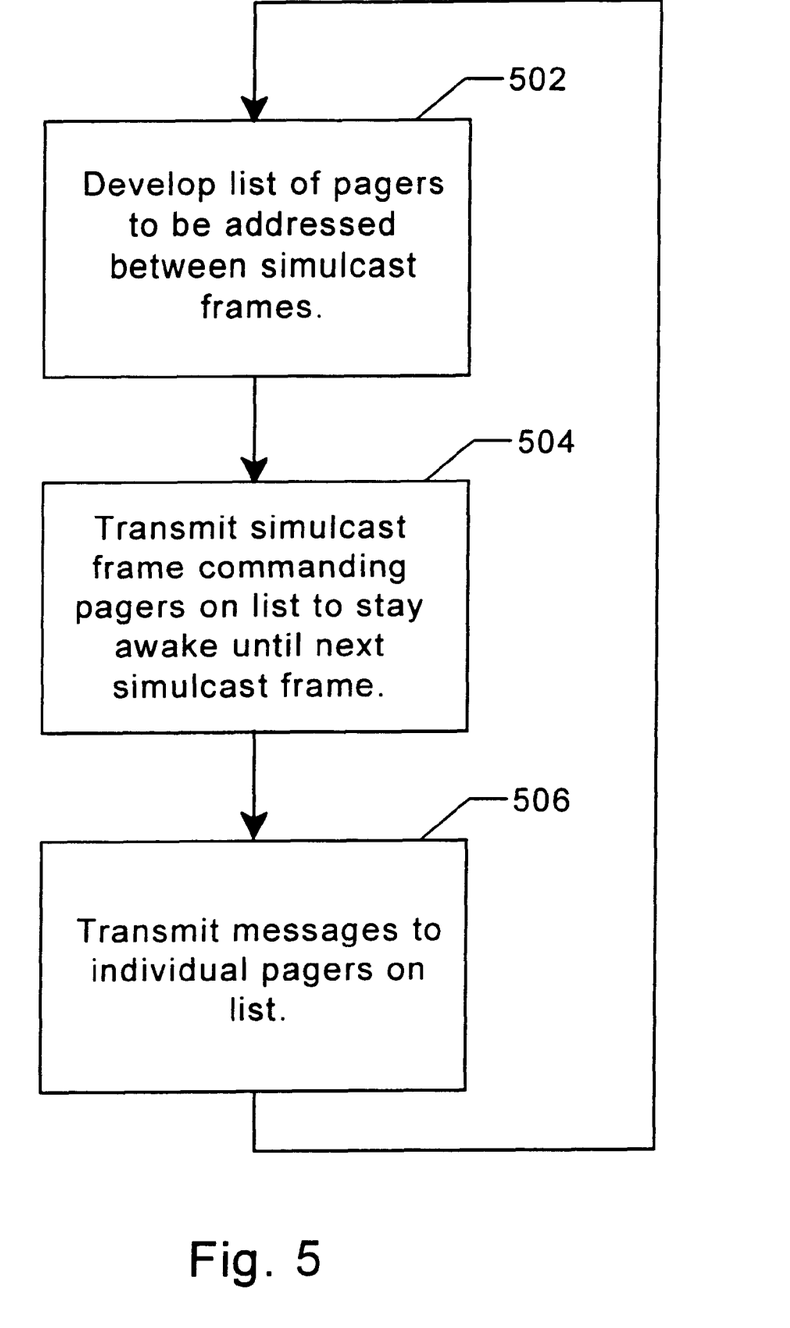
FIG. 5 depicts a flowchart describing steps of operating a pager network in accordance with an alternative embodiment of the present invention.

FIG. 5 depicts a flowchart describing further steps of operating a pager network in accordance with an alternative embodiment of the present invention. At step 502, pager transmitter site 102 develops a list of pagers to which individually addressed messages are to be transmitted between two successive simulcast messages. At step 504, this list is transmitted to all the pager receivers 106 within a simulcast message. Unlike the schedule discussed in reference to FIG. 4, this list need not more specifically identify the times of individually addressed transmissions to pager receivers. Each pager receiver 106 that receives the list looks up its own address on the list of pagers to be addressed on the list. If the pager receiver finds its own address on the list, it responds by remaining in the active state until the next simulcast message. If the pager receiver does not find its own address on the list, it responds by shifting into an inactive state until the next simulcast message. At step 506, pager transmitter site 102 transmits messages to the individual pagers on the list. When it is time for the next simulcast message, processing returns to step 502.

Figure 6:
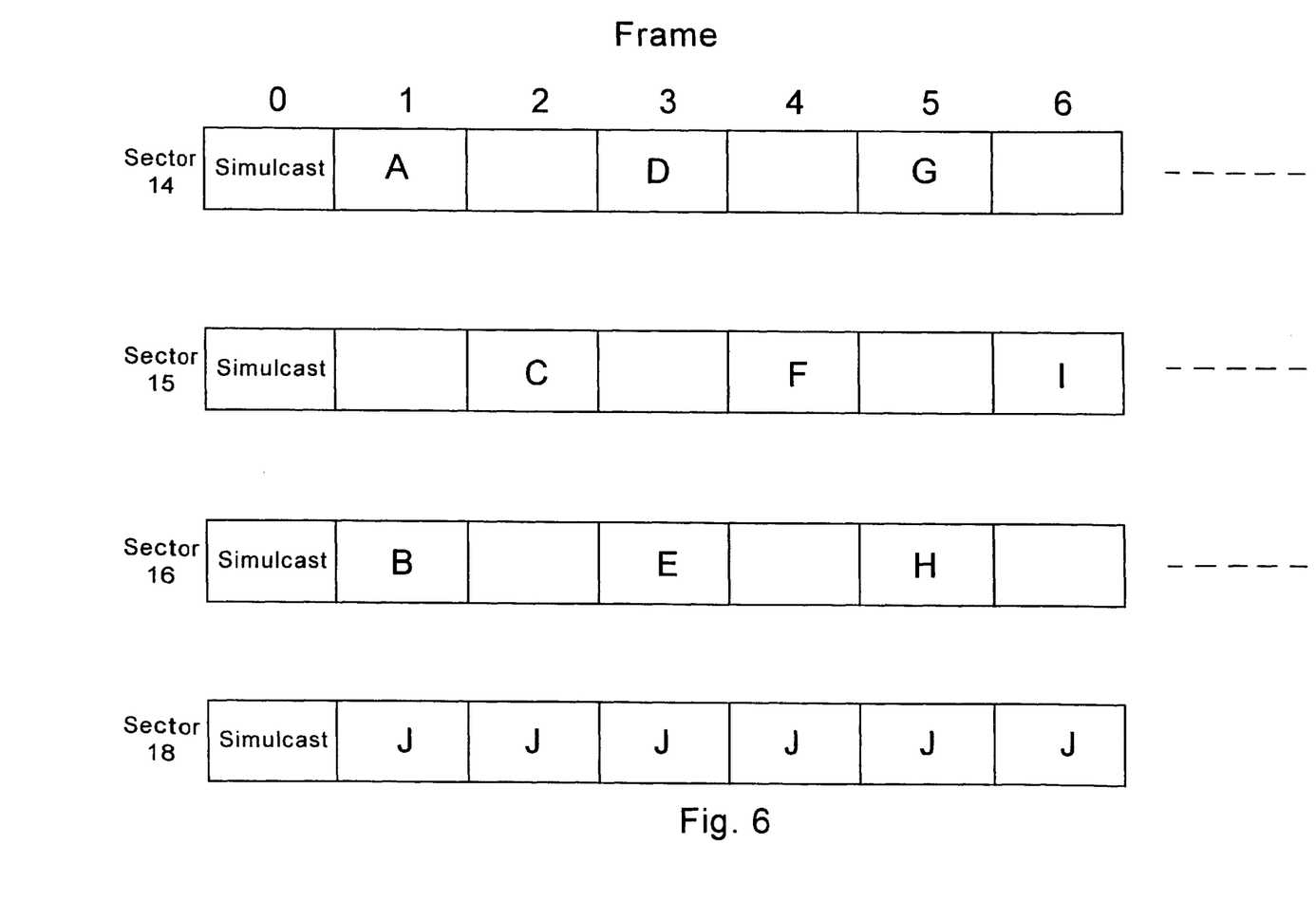
FIG. 6 depicts a timeline for a transmission scheme in accordance with one embodiment of the present invention.

FIG. 6 depicts timelines 600 for a transmission scheme in accordance with one embodiment of the present invention. Timelines 600 show transmission activity in sectors 14, 15, 16, and 18 of pager network 100 on a common frequency. Timelines 600 show the activity within the first seven frames of a FLEX cycle. All sectors are illuminated and carry the simulcast frame in frame 0. During frame 1, sectors 14 and 16 are illuminated while sector 15 is not illuminated. The signal directed to sector 14 includes a message for pager receiver A while the signal directed to sector 16 includes a message for pager receiver B. During frame 2, sector 15 is illuminated while sectors 14 and 16 are not illuminated. The signal directed to sector 15 includes a message for pager receiver C. The activity in each sector is illustrated up until frame 6. During frames 1 through 6, a message is transmitted in sector 18 to a pager receiver J there while sectors 17 and 19 (timelines not shown) are not illuminated.

It can be seen that in FIG. 6, adjacent sectors are not addressed simultaneously on the same frequency. Except for the simulcast frame, sector 15 is not illuminated at the same time as adjacent sectors 14 and 16. Sector 18 may be illuminated continuously during the seven sector period because sectors 17 and 19 are quiet.

The repetition frequency of the simulcast frame is preferably every 15 or 30 seconds. The simulcast frame preferably includes time and synchronization information in addition to the schedule discussed in reference to FIG. 4 and/or list discussed in reference to FIG. 5.

Figure 7:
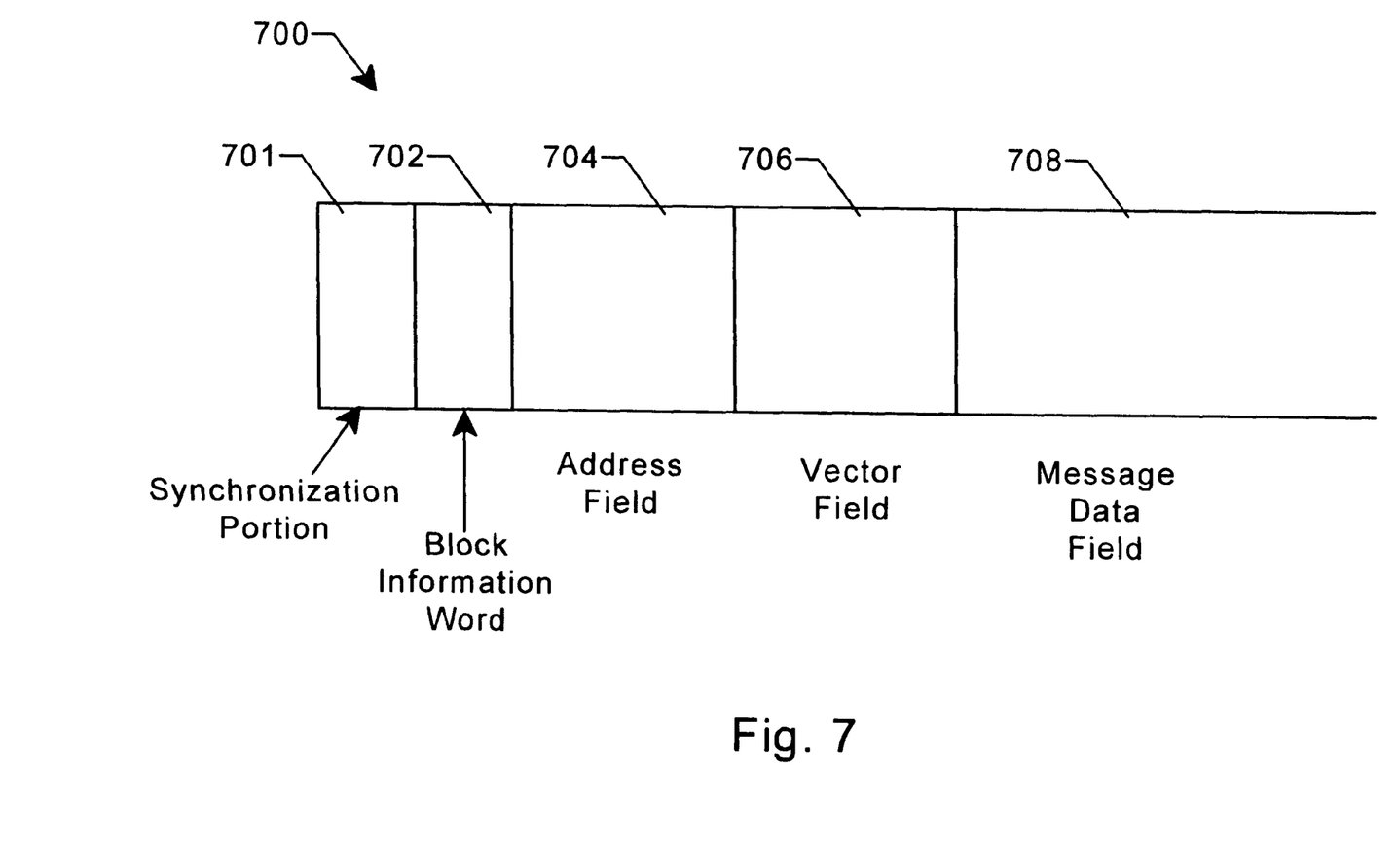
FIG. 7 depicts the composition of a FLEX frame as exploited by one embodiment of the present invention.

FIG. 7 depicts the composition of a FLEX frame 700 as exploited by one embodiment of the present invention. In accordance with the FLEX protocol, frame 700 includes a synchronization portion 701, a block information word 702, an address field 704, a vector field 706, and a message data field 708. Block information word 702 gives information defining the boundaries between the fields that follow. Address field 704 includes a list of addresses of pager receivers in the form of so-called CAP codes. The presence of an address in address field 704 may be the entirety of the command to a particular pager receiver having that address. However, for some addresses, there may be an associated vector in vector field 706. The vector may itself be a command or message or it may represent a pointer to message date within message field 708.

A simulcast frame according to the method of FIG. 4 may incorporate schedule information by listing the address of pager receivers to be addressed before the next simulcast frame in address field 704. Vector field 706 would then contain either vectors identifies the projected transmission frame or frames for each address or a pointer to data in the message fields identifying these frames. Alternatively, for the embodiment described in reference to FIG. 5, the list of pager receiver addresses in address field 704 is sufficient.

In comparing the embodiments of FIG. 4 and FIG. 5, it can be appreciated that transmitting only a list of pager addresses instead of a complete schedule of transmissions increases the number of pagers that can be addressed in a single simulcast frame. However, by giving a complete schedule, pagers to be addressed before a next simulcast frame need not stay on for the whole time prior to the next simulcast frame. Instead, they can switch to active mode only during the frames in which they have been scheduled to receive a message. This saves power and provides longer battery life and/or a smaller pager unit.

Figure 8:
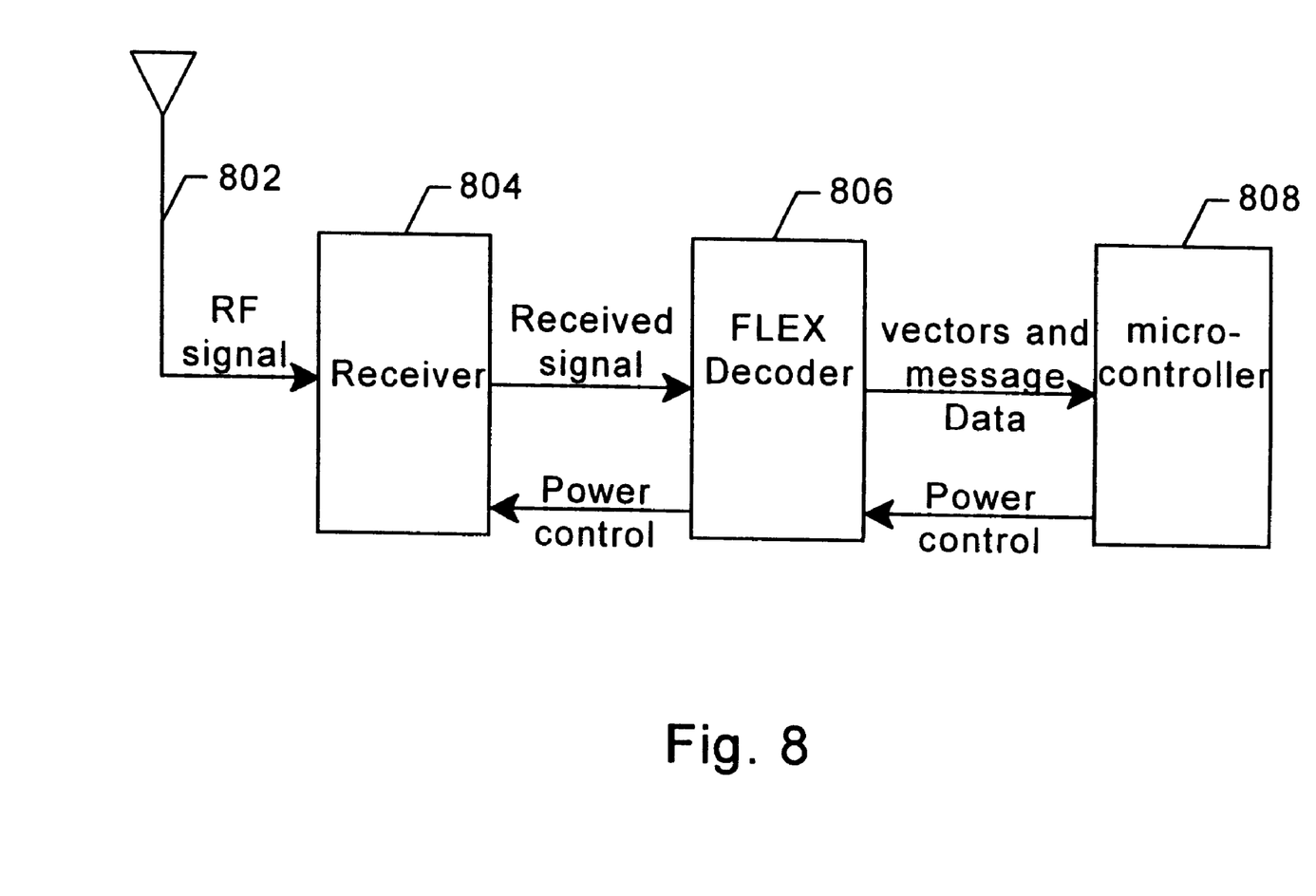
FIG. 8 depicts a simplified representation of the operation of an individual pager receiver in accordance with one embodiment of the present invention.

FIG. 8 depicts a simplified representation of the operation of an individual pager receiver 106 in accordance with one embodiment of the present invention. Pager receiver 106 includes an antenna 802, a receiver unit 804, a FLEX decoder 806, and a microcontroller 808. Antenna 802 receives FLEX pager signals which are demodulated by receiver unit 804. Receiver unit 804 presents FLEX decoder 806 with a demodulated receives signal. FLEX decoder 806 passes received data to microcontroller 808. The received data includes vectors and message data addressed to individual pager receiver 106 and an indication when pager receiver 106 has been addressed without vector and message data. FLEX decoder 806 may be the TMS320FLEX1™ chipset available from Texas Instruments of Dallas, Tex.

Microcontroller 808 is able to switch FLEX decoder 806 between an active state and a power-saving inactive state. FLEX decoder 806 responds to its own state changes by also switching receiver 804 between active and inactive states. In accordance with the invention, microcontroller 808 performs this switching in response to the schedule or list information received in the simulcast frame as was discussed in connection with FIGS. 4–5. Microcontroller 808 also switches FLEX decoder 806 and receiver 804 into an active state to receive the simulcast frame at the time specified by the programmed collapse value and base frame number.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents. For example, the discussion has primarily focussed on implementing the present invention by modification of the FLEX protocol. However, it would be possible to modify other standard pager protocols or construct a new protocol to implement features of the present invention.

What is claimed is:

1. A method for operating a pager network that transmits to a plurality of pager receivers, wherein each pager receiver is accessible in at least one of a plurality of sectors by a selected one of a plurality of channels, wherein each said sector corresponds to one of said channels, and wherein each pager receiver is switchable between an active state and an inactive state, said method comprising the steps of:
    a) developing a schedule of transmissions addressed to various pager receivers of said plurality of pager receivers, said schedule taking account of which of said sectors can be accessed simultaneously and which cannot be accessed simultaneously due to interference; and
    b) transmitting, to said plurality of sectors via all of said plurality of channels within a time interval, a simulcast message commanding each of said various pager receivers to switch to said active state in accordance with said schedule so that each of said various pager receivers is in said active state to receive its transmission and in said inactive state when there is nothing to receive.

2. The method of claim 1 further comprising the step of:
    c) transmitting messages individually targeted to said various pager receivers in accordance with said schedule, each said message being transmitted on a single channel of said plurality of channels.

3. The method of claim 2 wherein said simulcast message and said individually targeted messages are transmitted in accordance with a protocol belonging to the FLEX™ family wherein a transmission cycle is divided into a plurality of frames.

4. The method of claim 3 further comprising the step of repeating said a) and b) steps at intervals.

5. The method of claim 3 wherein said plurality of pager receivers are programmable to shift into an active state every M frames beginning with a kth one of said plurality of frames wherein M and k are programmable values, said method further comprising the step of:
    transmitting a command to each pager receiver of said plurality of pager receivers to program said value of M and said value of k identically for each pager receiver, thereby causing said plurality of pager receivers to shift into an active state for a frame including said simulcast message.

6. The method of claim 1 wherein said channels correspond to beams transmitted for a pager transmitter site.

7. The method of claim 1 wherein said channels correspond to transmitter sites, each transmitter site covering a cell.

8. A method for operating a pager network that transmits to a plurality of pager receivers, wherein each pager receiver is accessible in at least one of a plurality of sectors by a selected one of a plurality of channels, wherein each said sector corresponds to one of said channels, and wherein each pager receiver is switchable between an active state and an inactive state, said method comprising the steps of:
    a) developing a list of pager receivers to be addressed with individually targeted messages within a predetermined time interval, said list taking account of which of said sectors can be accessed simultaneously and which cannot be accessed simultaneously due to interference; and
    b) transmitting to said plurality of sectors via all of said plurality of channels near the beginning of said predetermined time interval, a message commanding each pager receiver on said list to be in an active state for the remainder of said predetermined time interval.

9. The method of claim 8 further comprising the step of:
    c) transmitting messages individually targeted to said pager receivers on said list, each said message being transmitted on a single channel of said plurality of channels.

10. The method of claim 9 wherein said simulcast message and said individually targeted messages are transmitted in accordance with a protocol belonging to the FLEX™ family wherein a transmission cycle is divided into a plurality of frames.

11. The method of claim 10 further comprising the step of repeating said b) steps for successive predetermined time intervals.

12. The method of claim 10 wherein said plurality of pager receivers are programmable to shift into an active state every M frames beginning with a kth one of said plurality of frames wherein M and k are programmable values, said method further comprising the step of:
    transmitting a command to each pager receiver of said plurality of pager receivers to program said value of M and said value of k identically for each pager receiver, thereby causing said plurality of pager receivers to shift into an active state for a frame including said simulcast message.

13. The method of claim 8 wherein said channels correspond to beams transmitted from a pager transmitter site.

14. The method of claim 8 wherein said channels correspond to transmitter sites, each transmitter site covering a cell.

15. In a pager network including a pager transmitter and a plurality of pager receivers, wherein each said pager receiver is accessible by said pager transmitter in at least one of a plurality of sectors, a method for operating a particular pager receiver of said plurality of pager receivers, said method comprising the steps of:

a) activating selected components of said particular pager receiver at a scheduled simulcast transmission time;

b) receiving a simulcast message from said pager transmitter at said scheduled simulcast transmission time, said simulcast message comprising a list of pager receivers to be accessed prior to a next simulcast message, based upon which of said sectors can be accessed simultaneously and which cannot be accessed simultaneously due to interference; and c) if said particular pager receiver is not on said list, deactivating said selected components until said next simulcast message.

16. The method of claim 15 wherein said simulcast message is transmitted as one or more FLEX™ frames.

17. The method of claim 15 further comprising the step of:

d) if said particular pager receiver is on said list, maintaining said selected components as active until said next simulcast message to receive a message directed to said particular pager receiver.

18. In a pager network including a plurality of pager receivers, wherein each pager receiver is accessible in at least one of a plurality of sectors by a pager transmitter, a method for operating a particular pager receiver of said plurality of pager receivers, said method comprising the steps of:

a) activating selected components of said particular pager receiver at a scheduled simulcast transmission time;

b) receiving a simulcast message from said pager transmitter at said scheduled transmission time, said simulcast message comprising transmission times of messages directed to individual ones of said pager receivers based upon which of said sectors can be accessed simultaneously and which cannot be accessed simultaneously due to interference; and c) de-activating said selected components of said particular pager receiver until a transmission time of a message directed to said particular pager receiver as indicated in said simulcast message.

19. The method of claim 18 wherein said simulcast message is transmitted as one or more FLEX™ frames.

20. In a pager network including a pager transmitter and a plurality of pager receivers, wherein each said pager receiver is accessible by said pager transmitter in at least one of a plurality of sectors, a method for operating a particular pager receiver of said plurality of pager receivers, said method comprising the steps of:

a) activating selected components of said particular pager receiver at a scheduled simulcast transmission time;

b) receiving a simulcast message from said pager transmitter at said scheduled transmission time, said simulcast message giving information about future transmissions directed to specific selected ones of said plurality of pager receivers based upon which of said sectors can be accessed simultaneously and which cannot be accessed simultaneously due to interference; and c) activating and/or deactivating said selected components of said particular pager receiver in accordance with anticipated transmissions to said particular pager receiver as given in said simulcast message.

* * * * *